(12) United States Patent
Wang et al.

(10) Patent No.: US 9,715,134 B2
(45) Date of Patent: Jul. 25, 2017

(54) LIQUID CRYSTAL MODULE AND CURVED SURFACE DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Fei Wang, Beijing (CN); Jing Yuan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/894,728

(22) PCT Filed: Jun. 11, 2015

(86) PCT No.: PCT/CN2015/081212
§ 371 (c)(1),
(2) Date: Nov. 30, 2015

(87) PCT Pub. No.: WO2016/045413
PCT Pub. Date: Mar. 31, 2016

(65) Prior Publication Data
US 2016/0291386 A1    Oct. 6, 2016

(30) Foreign Application Priority Data

Sep. 26, 2014  (CN) .......................... 2014 1 0504461

(51) Int. Cl.
*G02F 1/1333*  (2006.01)
*G02B 6/00*    (2006.01)
(Continued)

(52) U.S. Cl.
CPC ......... *G02F 1/133308* (2013.01); *G02B 6/00* (2013.01); *G02B 6/0041* (2013.01);
(Continued)

(58) Field of Classification Search
CPC ... G02F 1/133308; G02B 6/00; G02B 6/0041; G02B 6/0055; G02B 6/0088
See application file for complete search history.

(56) References Cited

U.S. PATENT DOCUMENTS

2009/0103009 A1* 4/2009 Ohmi ..................... G02B 6/002
349/65
2010/0289983 A1* 11/2010 Rocard ............. B29D 11/0074
349/62
(Continued)

FOREIGN PATENT DOCUMENTS

CN        1508568 A      6/2004
CN        101149520      3/2008
(Continued)

OTHER PUBLICATIONS

First Office Action from Chinese Application No. 201410504461.2, Jul. 28, 2016, 9 pages.
(Continued)

*Primary Examiner* — James Dudek
(74) *Attorney, Agent, or Firm* — Harness, Dickey & Pierce, P.L.C.

(57) ABSTRACT

The invention provides a liquid crystal module and a curved surface display device. According to the liquid crystal module and the curved surface display device, a curved surface liquid crystal panel can be kept stable, and deformation of the curved surface liquid crystal panel is reduced. The liquid crystal module comprises the liquid crystal panel and a backlight source, wherein the backlight source comprises a light guiding plate. The light-emitting surface, facing the
(Continued)

liquid crystal panel, of the light guiding plate is an inwards-concave arc-shaped curved surface, the liquid crystal panel is in an inwards-concave arc shape, and the liquid crystal panel is arranged on the light-emitting surface of the light guiding plate through a connecting member, wherein the curvature of the arc of the liquid crystal panel is the same as that of the light-emitting surface of the light guiding plate.

16 Claims, 1 Drawing Sheet

(51) Int. Cl.
    *F21V 8/00*        (2006.01)
    *G02F 1/1335*    (2006.01)

(52) U.S. Cl.
    CPC ......... *G02B 6/0043* (2013.01); *G02B 6/0055* (2013.01); *G02B 6/0088* (2013.01); *G02F 1/133615* (2013.01); *G02F 2001/133317* (2013.01); *G02F 2201/56* (2013.01); *G02F 2202/28* (2013.01)

(56) References Cited

U.S. PATENT DOCUMENTS

| | | | | |
|---|---|---|---|---|
| 2012/0020056 | A1* | 1/2012 | Yamagata | ......... G02F 1/133308 362/97.1 |
| 2014/0125913 | A1* | 5/2014 | Lee | ................... G02F 1/133615 349/58 |
| 2015/0160407 | A1* | 6/2015 | Hsiao | ................ G02F 1/133308 349/65 |
| 2015/0219324 | A1* | 8/2015 | Kim | .................. G02F 1/133305 349/58 |
| 2016/0109647 | A1* | 4/2016 | Hsiao | ................ G02F 1/133308 349/58 |

FOREIGN PATENT DOCUMENTS

| | | |
|---|---|---|
| CN | 101216635 | 7/2008 |
| CN | 102077263 | 5/2011 |
| CN | 103672614 | 3/2014 |
| CN | 103807814 | 5/2014 |
| CN | 104297999 | 1/2015 |
| JP | 2000111908 | 4/2000 |

OTHER PUBLICATIONS

International Search Report from PCT Application No. PCT/CN2015/081212, Sep. 2, 2015, 2 pages.
Written Opinion of the International Searching Authority from PCT Application No. PCT/CN2015/081212, Sep. 2, 2015, 6 pages.
Office Action from corresponding Chinese Application No. 201410504461.2, Feb. 13, 2017 (7 pages).

* cited by examiner

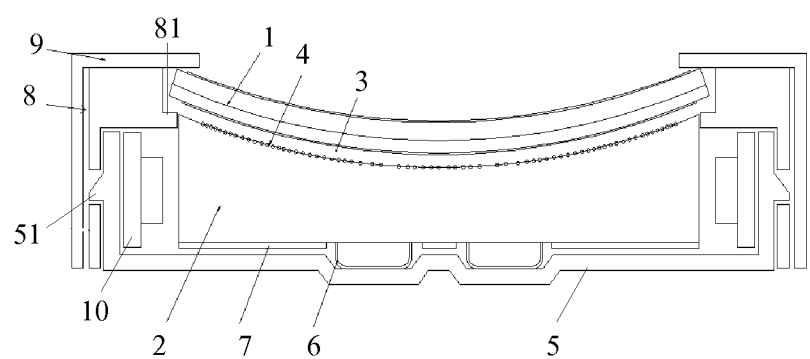

LIQUID CRYSTAL MODULE AND CURVED SURFACE DISPLAY DEVICE

CROSS-REFERENCES TO RELATED APPLICATIONS

This PCT patent application claims priority of Chinese Patent Application No. 201410504461.2, filed on Sep. 26, 2014, the entire content of which is incorporated by reference herein.

FIELD OF THE INVENTION

The present invention relates to a field of display technology, more particularly, to a liquid crystal module and a curved surface display device.

BACKGROUND

With the development of display technology, people's requirements on display device have been continuously raised. Currently, curved surface display technology has come into people's sight and has received extensive attention. Generally, display screen of a curved surface display device can provide optimal viewing effect from center to peripheral, while a reproduction capability of an ordinary display device at peripheral of the screen is relatively not ideal. The whole screen of a curved surface display device is in an arc shape, which can provide wide panorama image effect, and bring better visual enjoyment to user.

Curved surface display is realized in prior art mainly by manner of naturally bending a liquid crystal panel and pressing the liquid crystal panel by using a front frame. However, these fixing manners are not stable, the liquid crystal panel is prone to deformation which will affect display effect, and a processing difficulty of a curved backlight source employed by the curved surface display device during manufacture is relatively high.

BRIEF SUMMARY OF THE DISCLOSURE

Embodiments of the invention provides a liquid crystal module and a curved surface display device, so that a curved surface liquid crystal panel can be kept stable, and deformation of the curved surface liquid crystal panel is reduced, thereby improving display effect.

The present invention provides a liquid crystal module comprising a liquid crystal panel and a backlight source, the backlight source comprises a light guiding plate, a light-emitting surface, facing the liquid crystal panel, of the light guiding plate is an inwards-concave arc-shaped curved surface, the liquid crystal panel is in an inwards-concave arc shape, the liquid crystal panel is arranged on the light-emitting surface of the light guiding plate, and curvature of the arc of the liquid crystal panel is the same as that of the light-emitting surface of the light guiding plate.

Further, the liquid crystal panel is arranged on the light-emitting surface of the light guiding plate through a connecting member.

Still further, the connecting member is transparent adhesive.

Still further, the backlight source further comprises diffusion particles arranged on the light-emitting surface of the light guiding plate and used to diffuse light emitting from the light-emitting surface of the light guiding plate.

Still further, the diffusion particles are arranged on the light-emitting surface of the light guiding plate by manner of coating.

Still further, the diffusion particles are formed on the light-emitting surface of the light guiding plate by manner of integrating with the light guiding plate as a whole.

Still further, a bottom surface, opposite to the light-emitting surface, of the light guiding plate is a flat surface.

Still further, the backlight source further comprises a back plate on which a fixing structure for fixing the light guiding plate onto the back plate is arranged.

Still further, the fixing structure comprises a suction member fixed on the back plate, the suction member comprises a cavity having a suction opening facing the bottom surface of the light guiding plate, when the bottom surface of the light guiding plate is joined to the cavity, air pressure within the cavity is lower than air pressure outside of the cavity, such that the light guiding plate is fixed on the back plate through suction.

Still further, the suction member is made from white plastic material.

Still further, a reflection plate is arranged between the light guiding plate and the back plate, through holes are arranged on the reflection plate at positions corresponding to the suction member, the suction member goes through the through holes.

Still further, the backlight source further comprises a rubber frame and a back plate, the light guiding plate is arranged on the back plate, the rubber frame is arranged around the back plate, the rubber frame comprises support portions onto which end portions of the liquid crystal panel are lap jointed, the liquid crystal module further comprises a front frame arranged at periphery of the liquid crystal panel and used to fixedly connect the liquid crystal panel and the backlight source.

Still further, a straight slot is arranged on side wall of the rubber frame, bumps are arranged on the back plate at positions corresponding to the straight slot, the bumps are disposed in the straight slot.

Accordingly, the present invention also provides a curved surface display device comprising the above liquid crystal module provided by the invention.

In the present invention, a liquid crystal panel is arranged on a light-emitting surface of a light guiding plate through a connecting member, the liquid crystal panel can be stably arranged on the light guiding plate under fixing function of the connecting member, curvature of the arc of the liquid crystal panel and that of the light-emitting surface of the light guiding plate being the same can be more beneficial to the stable arrangement of the liquid crystal panel, therefore, the present invention is capable of reducing deformation of the curved surface liquid crystal panel occurring during displaying; diffusion particles are arranged on the light-emitting surface of the light guiding plate, so that light emitting from the light guiding plate can be more diffusive, such that brightness of the liquid crystal panel when an image is displayed is more uniform, and structure of the backlight source is simplified; furthermore, a bottom surface of the light guiding plate is a flat plane, the light guiding plate can be fixed without bending the back plate, which reduces processing difficulty; meanwhile, a fixing structure for fixing the light guiding plate is arranged onto the back plate, so that the light guiding plate is kept stable, thereby making the liquid crystal panel to be kept stable.

BRIEF DESCRIPTION OF THE DRAWINGS

The drawings are provided to facilitate further understanding of the present invention and constitute a part of the specification, they are used to explain the invention along with the following detailed embodiments of the invention, but are not a limitation to the invention, in which:

FIG. 1 is a structural diagram of a liquid crystal module of an embodiment of the invention;

wherein, reference numbers are as follows: 1. liquid crystal panel; 2. light guiding plate; 3. connecting member; 4. diffusion particles; 5. back plate; 51. bump; 6. suction member; 7. reflection plate; 8. rubber frame; 81. support portion; 9. front frame; 10. light bar.

DETAILED DESCRIPTION

Detailed description of the invention will be described in the following in conjunction with accompany drawings. It should be appreciated that, the detailed description of the invention here is only for illustrating and explaining the invention, and is not for limiting the invention.

As one aspect of the invention, there is provided a liquid crystal module, as shown in FIG. 1, the liquid crystal module comprises a liquid crystal panel 1 and a backlight source, the backlight source comprises a light guiding plate 2, a light-emitting surface, facing the liquid crystal panel 1, of the light guiding plate 2 is an inwards-concave arc-shaped curved surface, the liquid crystal panel 1 is in an inwards-concave arc shape, the liquid crystal panel 1 is arranged on the light-emitting surface of the light guiding plate through a connecting member 3, wherein, curvature of the arc of the liquid crystal panel 1 is kept to be the same as that of the light-emitting surface of the light guiding plate 2.

The liquid crystal module of the present invention is particularly suitable for a liquid crystal display device that conducts a curved surface display, since the liquid crystal panel 1 can be arranged on the light-emitting surface of the light guiding plate 2 through the connecting member 3, the liquid crystal panel 1 can be stably arranged on the light guiding plate 2 under fixing function of the connecting member 3, curvature of the arc-shaped curved surface of the liquid crystal panel 1 and that of the light-emitting surface of the light guiding plate 2 are the same, that is, the curved surface liquid crystal panel 1 and the light guiding plate are tightly mated, which is more beneficial to a stable arrangement of the curved surface liquid crystal panel 1 on the light guiding plate 2, thus reducing possibility that deformation occurs at the curved surface liquid crystal panel 1, and improving display effect.

The connecting member may have different structures, for example, the connecting member 3 may comprise a plurality of suction members for suctioning the liquid crystal panel, or the connecting member 3 may be an adhesive.

As a detailed embodiment of the invention, as shown in FIG. 1, the connecting member 3 is transparent adhesive such as hydrogel, but the invention is not limited thereto, as long as it can be ensured by the adhesive that the liquid crystal panel and the light guiding plate can be bonded together. Using transparent adhesive not only can stably connect the liquid crystal panel 1 to the light guiding plate 2, but also can reduce impact on light of the backlight source.

In the backlight source, a light bar 10 is set at the light incoming surface of the light guiding plate 2, the point light emitted from the light emitting element on the light bar 10 forms an area light source after passing through the light guiding plate 2. Usually, the backlight source further comprises therein a diffusion layer for diffusing light, the diffusion layer is used to refract, reflect and scatter light emitted from the light emitting surface of the light guiding plate 2 towards different directions, so that light is more diffusive, such that brightness of the liquid crystal panel when an image is displayed is more uniform. When a diffusion layer is included in the backlight source, the diffusion layer may be arranged on the light guiding plate, and then the liquid crystal panel is arranged on the diffusion layer. To prevent deformation from occurring at the liquid crystal panel, a connecting member 3 may be arranged between the liquid crystal panel 1 and the diffusion layer and between the diffusion layer and the light guiding plate 2 respectively, such that the diffusion layer and the liquid crystal panel 1 are kept fixed, thereby preventing deformation at the curved liquid crystal panel.

To simplify structure of the backlight source, as shown in FIG. 1, the backlight source may further comprise diffusion particles 4. The diffusion particles 4 are arranged on light emitting surface of the light guiding plate 2 to form a diffusion layer, and are used to diffuse light emitted from the light emitting surface of the light guiding plate 2. The connecting member 3 is arranged between the layer where diffusion particles are arranged and the liquid crystal panel 1. As compared to a diffusion layer of a backlight source in prior art, when realizing diffusion of light by using the diffusion particles 4, there is no need for the present invention to provide a special film material to coat diffusion particles 4, thus saving production material and also simplifying structure of the backlight source. Moreover, the advantage of forming a diffusion layer by using diffusion particles lies in that the diffusion layer can be made to be bent in the same curvature as the light guiding plate, thus realizing curved surface display.

As one detailed embodiment of the invention, the diffusion particles 4 are arranged on the light emitting surface of the light guiding plate 2 by manner of coating, that is, first, a light guiding plate 2 whose light emitting surface is an inwards-concave curved surface is formed through injection molding, then the diffusion particles 4 are uniformly mixed in a dissolvent, and then the dissolvent mixed with the diffusion particles 4 is coated on the light emitting surface of the light guiding plate 2.

As another detailed embodiment of the invention, the diffusion particles 4 are formed on the light-emitting surface of the light guiding plate 2 by manner of integrating with the light guiding plate 2 as a whole, the integrated structure can be made through a molding process.

Further, as shown in FIG. 1, a bottom surface, opposite to the light-emitting surface, of the light guiding plate 2 is a flat surface. As compared to a light guiding plate in prior art whose light-emitting surface and light-incoming surface are both curved surface, arranging the bottom surface of the light guiding plate 2 as a flat surface would be more convenient to fix the light guiding plate 2.

Further, the backlight source may also comprise a back plate 5 onto which both the light guiding plate 2 and the light bar 10 are arranged, there is arranged, on the back plate 5, a fixing structure for fixing the light guiding plate 2 onto the back plate 5, so that light guiding plate 2 is kept stable, thus the liquid crystal panel 1 is kept stable. It is appreciated that, in the prior art, to fix a light guiding plate 2 whose bottom surface is a curved surface, generally the back plate needs to be arranged as a curved shape so as to fit the light guiding plate, thus increasing manufacture difficulty, while in the present invention, since bottom surface of the light guiding plate is a flat surface, there is no need to bend the back plate, thus reducing processing difficulty.

The present invention has no limitation on forms of the fixing structure, for example, the fixing structure may be an adhesive, and the light guiding plate 2 is fixedly connected to the back plate 5 through the adhesive. As a preferred embodiment of the present invention, as shown in FIG. 1, the fixing structure comprises a suction member 6 fixed on the back plate 5, the suction member 6 may be fixed on the back plate 5 by double faced adhesive tape or other binder. The suction member 6 comprises a cavity having a suction opening facing the bottom surface of the light guiding plate 2, when the light guiding plate 2 is joined to the cavity, air pressure within the cavity is lower than air pressure outside of the cavity, such that the light guiding plate 2 is fixed on the back plate 5 through suction. When assembling the liquid crystal module during manufacturing, the suction opening may be joined to the bottom surface of the light guiding plate 2 first, and then the cavity is subjected to squeeze or air exhaustion, so that air pressure within the cavity is lower than air pressure outside of the cavity, such that the light guiding plate 2 is fixed on the back plate 5 through suction, thus realizing fixed connection between the light guiding plate 2 and the back plate 5. The present invention has no limitation on the shape of the cavity, as long as the light guiding plate 2 can be fixed on the back plate 5 through suction.

Further, preferably, the suction member 6 is made from white plastic material, using of plastic material is to facilitate squeezing the cavity to reduce air pressure within the cavity, setting color of the plastic material as white is beneficial to reflection of light leaked from the bottom surface of the light guiding plate, and to improve light utilization.

Still further, as shown in FIG. 1, a reflection plate 7 is arranged between the light guiding plate 2 and the back plate 5, through holes are arranged on the reflection plate 7 at positions corresponding to the suction member 6, the suction member 6 goes through the through holes. The light guiding plate 2 may be fixed on the back plate 5, and meanwhile, the suction member 6 can also contribute to fixing of the reflection plate 7 to prevent displacement of the reflection plate 7. The reflection plate 7 is used to reflect light leaked from the bottom surface of the light guiding plate 2, when the suction member 6 is made from white plastic material, the effect of reflecting light can be improved, thus improving light utilization, and alleviating impact on light reflection when through holes are arranged on the reflection plate 7.

Still further, as shown in FIG. 1, the backlight source may further comprise a rubber frame 8 arranged around the back plate 5, the rubber frame 8 comprises support portions 81, the liquid crystal panel 1 is arranged on the light emitting surface of the light guiding plate 2 through the connecting member 3, and end portions of the liquid crystal panel 1 exceeding the light emitting surface may be lap jointed on the support portions 81, the liquid crystal module further comprises a front frame 9 arranged at periphery of the liquid crystal panel 1 and used to fixedly connect the liquid crystal panel 1 and the backlight source.

As shown in FIG. 1, a straight slot is arranged on side wall of the rubber frame 8, bumps 51 are arranged on the back plate 5 at positions corresponding to the straight slot, the bumps 51 are disposed in the straight slot, thereby fixedly connecting the rubber frame 8 and the back plate 5.

The foregoing is a description of the liquid crystal module provided by the present invention, it can be seen that, the liquid crystal panel can be arranged on the light emitting surface of the light guiding plate through a connecting member, the liquid crystal panel can be stably arranged on the light guiding plate under fixing function of the connecting member, thereby reducing deformation of the curved surface liquid crystal panel occurred during displaying; diffusion particles are arranged on the light-emitting surface of the light guiding plate, so that light emitting from the light guiding plate can be more diffusive, such that brightness of the liquid crystal panel when an image is displayed is more uniform, and thus structure of the backlight source is simplified; furthermore, a bottom surface of the light guiding plate is a flat plane, the light guiding plate can be fixed without bending the back plate; meanwhile, a fixing structure for fixing the light guiding plate is arranged onto the back plate, so that the light guiding plate is kept stable, thereby making the liquid crystal panel to be kept stable.

As another aspect of the invention, there is provided a curved surface display device comprising the liquid crystal module provided by the present invention. When conducting curved surface display, since the liquid crystal module of the invention can reduce deformation of the liquid crystal panel, display effect is enhanced and material saving is achieved, thus, display quality of the curved surface display device is improved to some extent, production cost is somewhat reduced, and manufacturing process is more simple.

It is appreciated that, the above embodiments are merely illustrative embodiments employed for illustrating principle of the invention, and the invention is not limited thereto. Various variations and improvements may be made by those skilled in the art without departing from the spirit and essence of the invention, such variations and improvements are also considered as protection scope of the invention.

What is claimed is:

1. A liquid crystal module comprising:
a liquid crystal panel; and
a backlight source, the backlight source comprising a light guiding plate and a back plate on which a fixing structure for fixing the light guiding plate onto the back plate is arranged, wherein a light-emitting surface, facing the liquid crystal panel, of the light guiding plate is an inwards-concave arc-shaped curved surface, the liquid crystal panel is in an inwards-concave arc shape, the liquid crystal panel is arranged on the light-emitting surface of the light guiding plate, curvature of the arc of the liquid crystal panel is the same as that of the light-emitting surface of the light guiding plate, the fixing structure comprises a suction member fixed on the back plate, the suction member comprises a cavity having a suction opening facing a bottom surface of the light guiding plate, and when the bottom surface of the light guiding plate is joined to the cavity, air pressure within the cavity is lower than air pressure outside the cavity, such that the light guiding plate is fixed on the back plate through suction.

2. The liquid crystal module according to claim 1, wherein, the liquid crystal panel is arranged on the light-emitting surface of the light guiding plate through a connecting member.

3. The liquid crystal module according to claim 2, wherein, the connecting member is transparent adhesive.

4. The liquid crystal module according to claim 1, wherein, the backlight source further comprises diffusion particles arranged on the light-emitting surface of the light guiding plate and used to diffuse light emitting the light-emitting surface of the light guiding plate.

5. The liquid crystal module according to claim 4, wherein, the diffusion particles are arranged on the light-emitting surface of the light guiding plate by manner of coating.

6. The liquid crystal module according to claim 4, wherein, the diffusion particles are formed on the light-emitting surface of the light guiding plate by manner of integrating with the light guiding plate as a whole.

7. The liquid crystal module according to claim 1, wherein the bottom surface, opposite to the light-emitting surface, of the light guiding plate is a flat surface.

8. The liquid crystal module according to claim 1, wherein the suction member is made from white plastic material.

9. The liquid crystal module according to claim 1, wherein a reflection plate is arranged between the light guiding plate and the back plate, through holes are arranged on the reflection plate at positions corresponding to the suction member, and the suction member goes through the through holes.

10. The liquid crystal module according to claim 1, wherein the backlight source further comprises a rubber frame, the light guiding plate is arranged on the back plate, the rubber frame is arranged around the back plate, the rubber frame comprises support portions onto which end portions of the liquid crystal panel are lap jointed, and the liquid crystal module further comprises a front frame arranged at periphery of the liquid crystal panel and used to fixedly connect the liquid crystal panel and the backlight source.

11. The liquid crystal module according to claim 10, wherein, a straight slot is arranged on side wall of the rubber frame, bumps are arranged on the back plate at positions corresponding to the straight slot, the bumps are disposed in the straight slot.

12. A curved surface display device, comprising the liquid crystal module according to claim 1.

13. The curved surface display device according to claim 12, wherein, the liquid crystal panel is arranged on the light-emitting surface of the light guiding plate through a connecting member.

14. The curved surface display device according to claim 12, wherein, the backlight source further comprises diffusion particles arranged on the light-emitting surface of the light guiding plate and used to diffuse light emitting the light-emitting surface of the light guiding plate.

15. The curved surface display device according to claim 12, wherein, the bottom surface, opposite to the light-emitting surface, of the light guiding plate is a flat surface.

16. The curved surface display device according to claim 12, wherein the backlight source further comprises a rubber frame, the light guiding plate is arranged on the back plate, the rubber frame is arranged around the back plate, the rubber frame comprises support portions onto which end portions of the liquid crystal panel are lap jointed, and the liquid crystal module further comprises a front frame arranged at periphery of the liquid crystal panel and used to fixedly connect the liquid crystal panel and the backlight source.

* * * * *